(12) United States Patent
Bianco et al.

(10) Patent No.: US 9,764,604 B2
(45) Date of Patent: Sep. 19, 2017

(54) VEHICLE DETECTION SYSTEM USING RFID TAGS

(71) Applicants: James S. Bianco, Suffield, CT (US); John Fahy, Longmeadow, MA (US)

(72) Inventors: James S. Bianco, Suffield, CT (US); John Fahy, Longmeadow, MA (US)

(73) Assignee: Control Module, Inc., Enfield, CT (US)

(*) Notice: Subject to any disclaimer, the term of this patent is extended or adjusted under 35 U.S.C. 154(b) by 0 days.

(21) Appl. No.: 14/714,659

(22) Filed: May 18, 2015

(65) Prior Publication Data
US 2015/0348343 A1 Dec. 3, 2015

Related U.S. Application Data

(60) Provisional application No. 62/000,289, filed on May 19, 2014.

(51) Int. Cl.
| | |
|---|---|
| *G05B 19/00* | (2006.01) |
| *B60C 11/24* | (2006.01) |
| *G08G 1/017* | (2006.01) |
| *G06K 7/10* | (2006.01) |
| *G07F 13/00* | (2006.01) |

(52) U.S. Cl.
CPC ........ *B60C 11/243* (2013.01); *G06K 7/10009* (2013.01); *G06K 7/10356* (2013.01); *G06K 7/10366* (2013.01); *G07F 13/00* (2013.01); *G08G 1/017* (2013.01)

(58) Field of Classification Search
None
See application file for complete search history.

(56) References Cited

U.S. PATENT DOCUMENTS

| | | | | |
|---|---|---|---|---|
| 5,700,999 A | * | 12/1997 | Streicher | B67D 7/346 235/381 |
| 2010/0273543 A1 | * | 10/2010 | Weitzhandler | H01Q 1/2216 455/575.7 |
| 2013/0103585 A1 | * | 4/2013 | Carapelli | G06Q 20/202 705/44 |
| 2014/0327778 A1 | * | 11/2014 | McQuade | G08G 1/0175 348/156 |
| 2015/0323662 A1 | * | 11/2015 | Swope | G06K 7/10366 342/158 |
| 2016/0012261 A1 | * | 1/2016 | Kelrich | B67D 7/348 340/10.51 |

* cited by examiner

*Primary Examiner* — Adolf Dsouza
(74) *Attorney, Agent, or Firm* — Alix, Yale & Ristas, LLP

(57) ABSTRACT

A fuel dispensing installation employs multiple fuel islands with fuel dispensers and multiple fuel/travel lanes. The installation employs a communication/controller system for automatically identifying a vehicle, and upon authorizing the vehicle, allowing fuel to be dispensed to said vehicle, determining the quantity of fuel dispensed to the vehicle and securing the dispenser when the vehicle leaves a detection zone. The detection system employs RFID tags placed at both the driver side and the passenger side of the vehicle. Generally oppositely oriented antennas define a detection zone for each of the lanes. A light indicates whether the vehicle is authorized for receiving fuel.

13 Claims, 6 Drawing Sheets

VEHICLE DETECTION SYSTEM USING RFID TAGS

CROSS-REFERENCE TO RELATED APPLICATION

This application claims the priority of U.S. Provisional Patent Application No. 62/000,289 filed on May 19, 2014, the disclosure of which is incorporated in its entirety by reference.

BACKGROUND

This disclosure relates generally to installations and methods for detecting vehicles using RFID tags. More particularly, the present disclosure relates to systems which employ automatic detection of vehicles to control the dispensing of fuel.

SUMMARY

A method for validating authorization of a vehicle having a driver side and a passenger side comprises encoding a first RFID tag with data concerning the vehicle ID and a driver side indicator and encoding a second RFID tag with data concerning the vehicle ID and a passenger side indicator. The method further comprises mounting the first RFID tag to the driver side of the vehicle and mounting the second RFID tag to the passenger side of the vehicle. The method further comprises generating a passenger side detection zone in a first lane and generating a driver side detection zone in a second lane and positioning the vehicle in a driver side or a passenger side detection zone for a pre-established time interval. The method comprises reading data from an RFID tag of the vehicle and processing the data to determine whether or not the vehicle is authorized.

A signal is generated to allow fuel to be dispensed from a fuel dispenser. A termination signal is generated to terminate the dispensing of fuel when a pre-determined fuel quantity has been dispensed. A control signal secures the fuel dispenser when the vehicle leaves a detection zone. The amount of dispensed fuel is automatically recorded. A light is generated which indicates that the vehicle is within a detection zone. A distinctive authorized light signal is generated to indicate that the vehicle is authorized for fuel dispensing.

In one embodiment, the dispensing of fuel to the authorized vehicle is automatically terminated by a maximum authorized fuel amount for the vehicle being exceeded, the expiration of or a pre-established time interval after the fueling has stopped or expiration of a pre-established time interval after a loss of detection of the authorized RFID tag. The method may also comprise encoding data comprising a vehicle fuel type, a customer code and a site code for the vehicle.

A method for automatically validating authorization for receiving fuel at a multi-lane fuel dispensing installation of a vehicle having a driver side RFID tag and a passenger side RFID tag comprises positioning the vehicle in the driver lane adjacent a fuel island having a fuel dispenser. The method further comprises generating a detection zone which intersects only a driver RFID tag or a passenger side RFID tag and reading data from the RFID tag in the detection zone. The method further comprises processing the data to determine whether or not the vehicle is authorized.

The authorization method may also further comprise generating a signal to allow fuel to be dispensed from a fuel dispenser, generating a signal to determine the amount of fuel to be dispensed and the identity of the vehicle and generating a control signal to secure the fuel dispenser when the vehicle leaves the detection zone.

An automatic fuel dispensing installation for a plurality of vehicles in one embodiment comprises a first and a second fuel dispensing island. An intermediate travel lane is disposed between the first and the second islands and a first travel lane is disposed adjacent the first island and a second travel lane adjacent the second island. At least one fuel dispenser is located on each of the first and the second islands. A pair of generally oppositely oriented antennae generates a first detection zone in said first travel lane and generates a second zone in said intermediate zone. A communication/controller module communicates with the antennae and a said dispenser wherein if a vehicle RFID is detected in the first zone or the second zone and remains a pre-established time, a said fuel dispenser is accessed to supply fuel to the vehicle. The communication/controller module automatically determines the quantity of supplied fuel, terminates fuel dispensing to the vehicle under certain conditions and secures the dispenser when the vehicle RFID tag exits the detection zone.

A light indicates that a vehicle is within a detection zone. A post, which vertically extends from the first island, mounts the antennae. The automatic fuel dispensing installation also comprises a light which emits a distinctive light signal which indicates that a vehicle is authorized for fuel dispensing.

In one embodiment, a third fuel dispensing island is disposed adjacent the second travel lane. The third island has one fuel dispenser and a pair of generally oppositely oriented antennae generating a third detection zone in the second travel lane. A third travel lane is disposed adjacent the third island, and one of the antennae generates a detection zone in the third travel lane.

The communication/controller module further automatically terminates the dispensing of fuel to an authorized vehicle if a maximum fuel amount for the vehicle is exceeded or a pre-established time is exceeded after the fueling is stopped or a pre-established time of loss of detection of the authorized RFID tag is exceeded.

DETAILED DESCRIPTION

With reference to the drawings, a vehicle detection system using RFID tags is employed to identify vehicles and to validate authorization for the vehicle within the context of a fuel dispensing station. The system also provides a very user-friendly interface between the vehicle driver and the fuel dispensing station. The vehicles are automatically identified at a low cost per vehicle, and the RFID tags on the vehicles are reliably validated with a high degree of integrity. The system is operable to alert the driver that the tag is in a read zone of the dispensing station.

Once the vehicle is validated as being authorized to receive fuel, the fuel dispenser is automatically controlled and the dispensed fuel is automatically measured. Once the fueling is completed, the dispenser is secured. When the vehicle exits the validation zone, the dispenser is also secured. The system is also configured to disregard an otherwise valid tag which passes through an invalid read zone.

A key feature of the detection system is that each vehicle is equipped with two low-profile RFID tags which are permanently mounted to the vehicle. One tag is mounted to the driver side of the vehicle. A second tag is mounted to the passenger side of the vehicle. For purposes of describing the invention which has applicability to any vehicle, the disclosure is described with reference to trucks. The preferred application is in connection with a fuel dispensing facility for a fleet of trucks.

Figure 1:
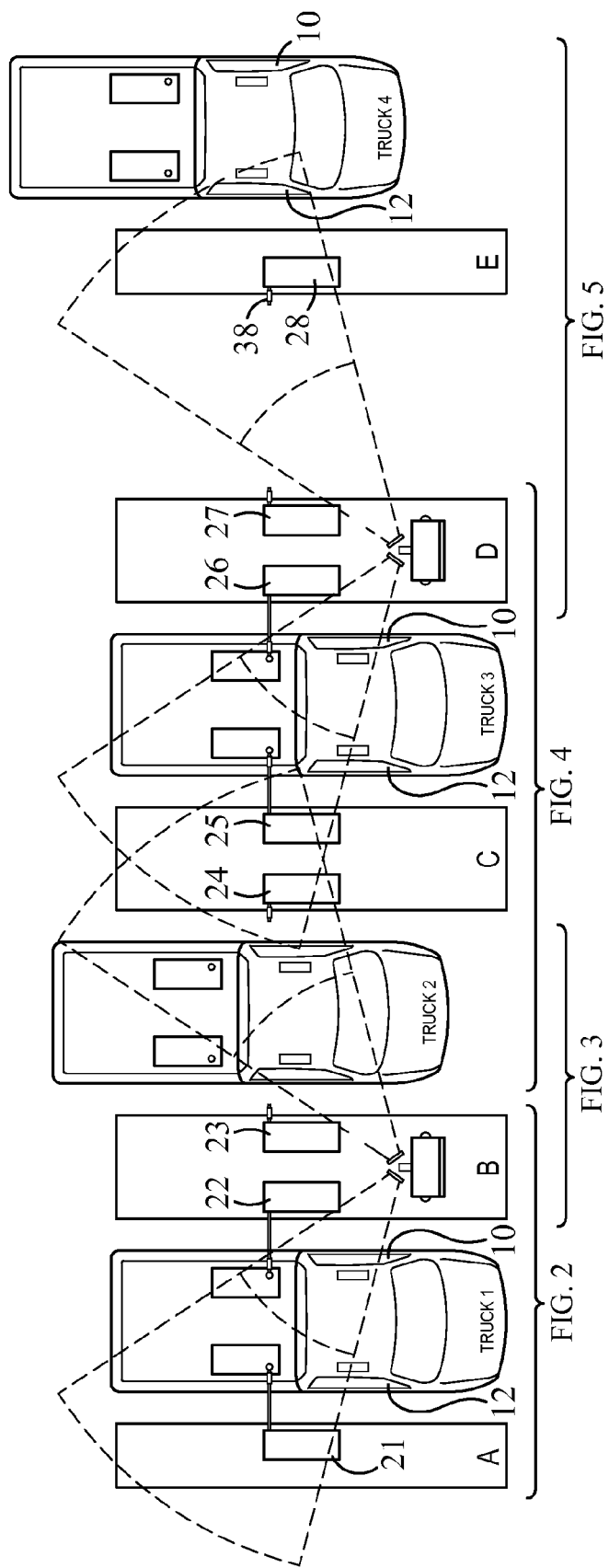
FIG. 1 is an annotated overhead schematic view of a multiple fuel dispensing station together with multiple representative vehicles in various positions illustrating an RFID tag detection system in accordance with the present disclosure.

With reference to FIG. 1, a representative dispensing facility 20 has five dispensing islands designated A, B, C, D and E. Fuel lanes T1-T4 are defined between the respective islands A-E and a representative passing lane is defined adjacent dispensing island E. For purposes of illustration of the detection system, representative vehicles designated as trucks 1-4 are positioned at various positions with respect to the fuel lanes and the dispensing islands.

Each of the trucks includes a unique RFID tag 10 on the driver side of the truck and a unique RFID tag 12 mounted at the passenger side of the truck. Each of the RFID tags 10 and 12 contain at least the following information:

Vehicle ID (VIN) number
Passenger or driver side code designating which side of the vehicle the RFID tag is positioned
Vehicle fuel type
Customer code
Site code for the vehicle For the illustrated embodiment, island A has a fuel dispenser 21 with a hose and nozzle 31. Island B has a pair of back-to-back fuel dispensers 22 and 23 with corresponding hoses and nozzles 32 and 33. Fuel island C has a pair of back-to-back fuel dispensers 24 and 25 with corresponding hoses and nozzles 34 and 35. Fuel island D has a pair of back-to-back fuel dispensers 26 and 27 with corresponding hoses and nozzles 36 and 37. Fuel island E has a single fuel dispenser 28 with a corresponding hose and nozzle 38. The fuel dispensers 21-28 preferably generally align transversely across the fuel dispensing station 20. Naturally, there may be additional fuel islands, fuel dispensers and corresponding hoses and nozzles.

Figure 2:
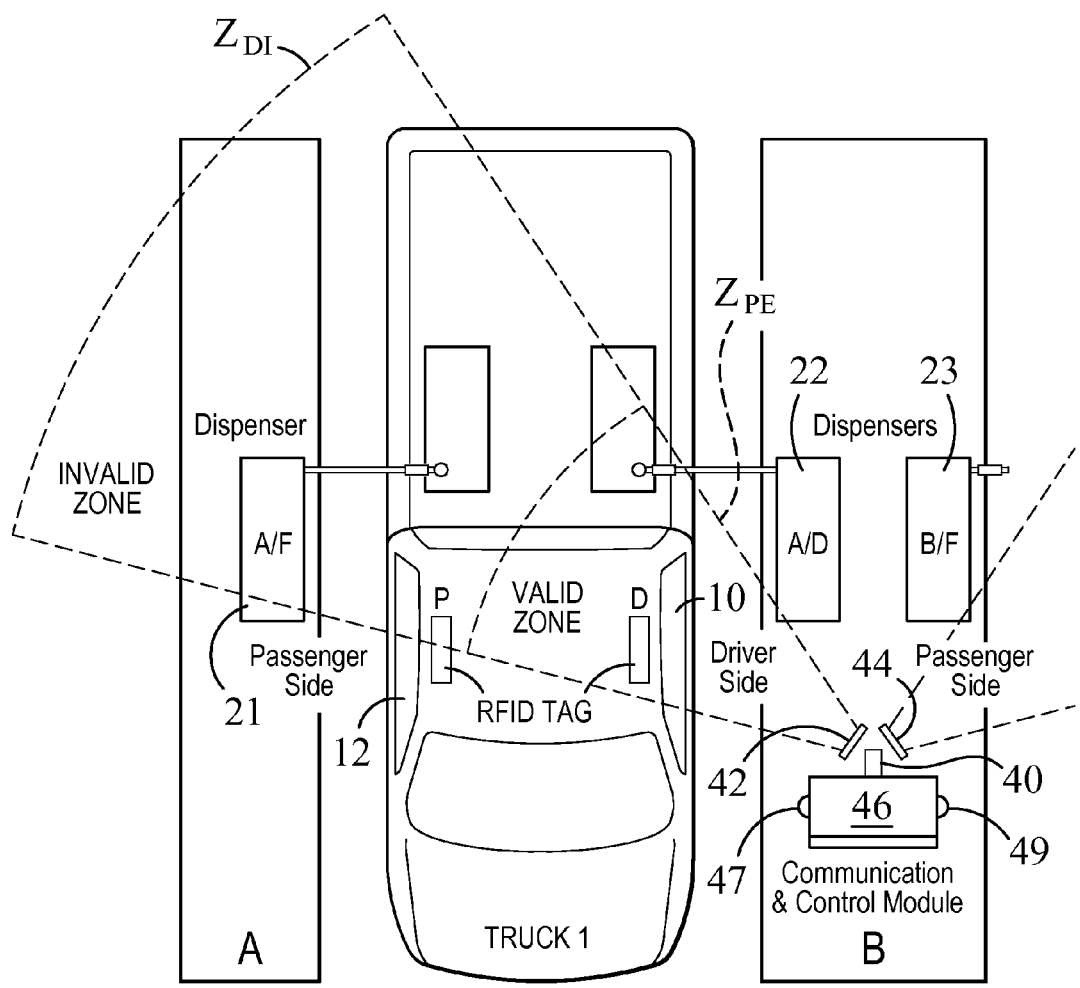
FIG. 2 is an enlarged first portion of the dispensing station and vehicles of FIG. 1.
Figure 6:
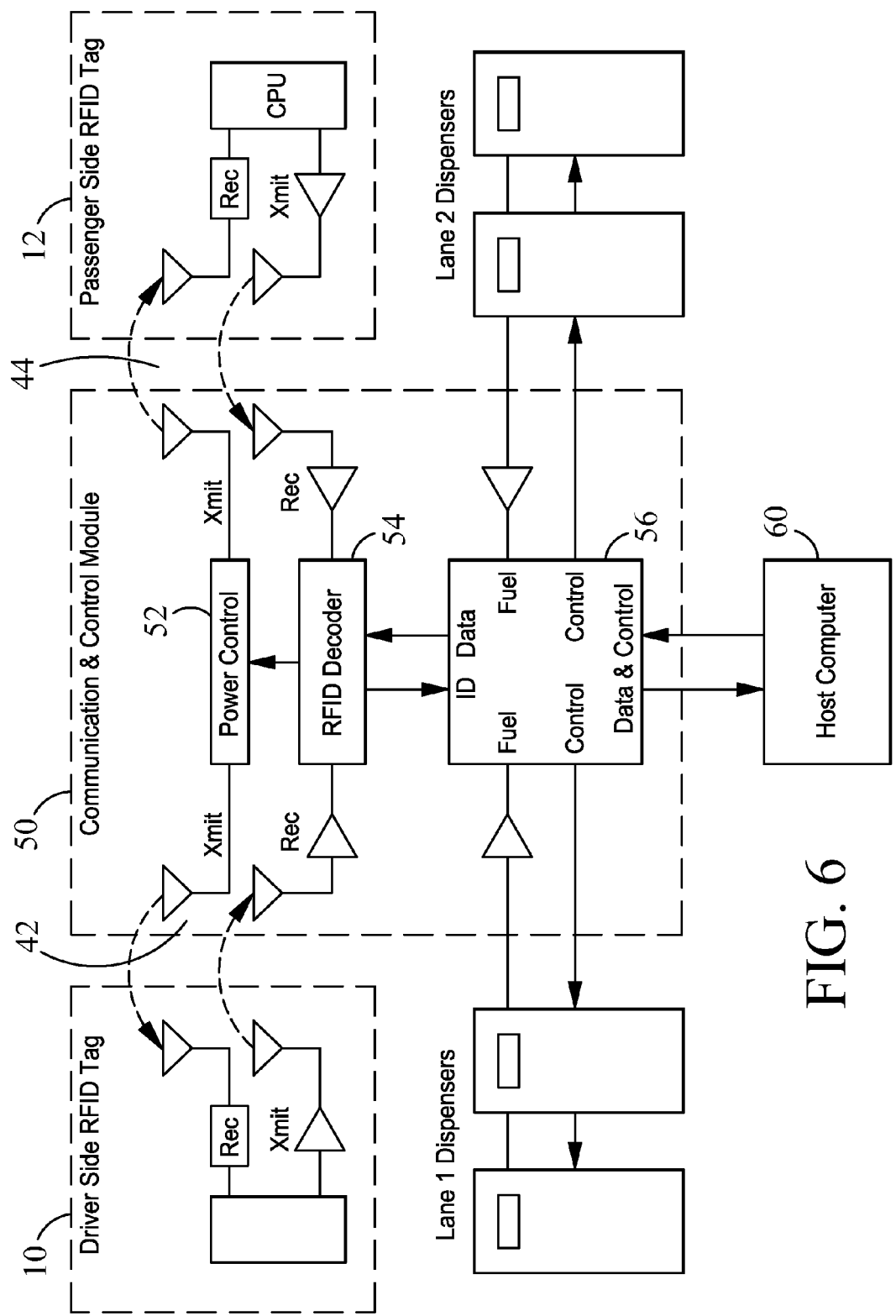
FIG. 6 is a block diagram for the RFID tag vehicle detection system of FIG. 1.

With additional reference to FIG. 2, a pole 40 is mounted on fuel island B. The pole 40 mounts a pair of high-gain directional RF antennae 42 and 44 mounted generally opposite each other at an angle to an adjacent travel lane with one facing the driver side fueling lane (Fuel Lane 1) and the second side facing the passenger side fueling lane (Fuel Lane 2). The pole 40 also mounts a cabinet 46 housing a communication and control module 50 (FIG. 6). The side of a cabinet 46 for the module mounts a pair of status lights 47 and 49 at opposed sides, one facing the driver side and the other facing the passenger side, as indicated. The status lights preferably employ LEDs. In some embodiments (not illustrated), the status lights 47 and 49 are suspended at the underside of the cabinet 46.

Figure 3:
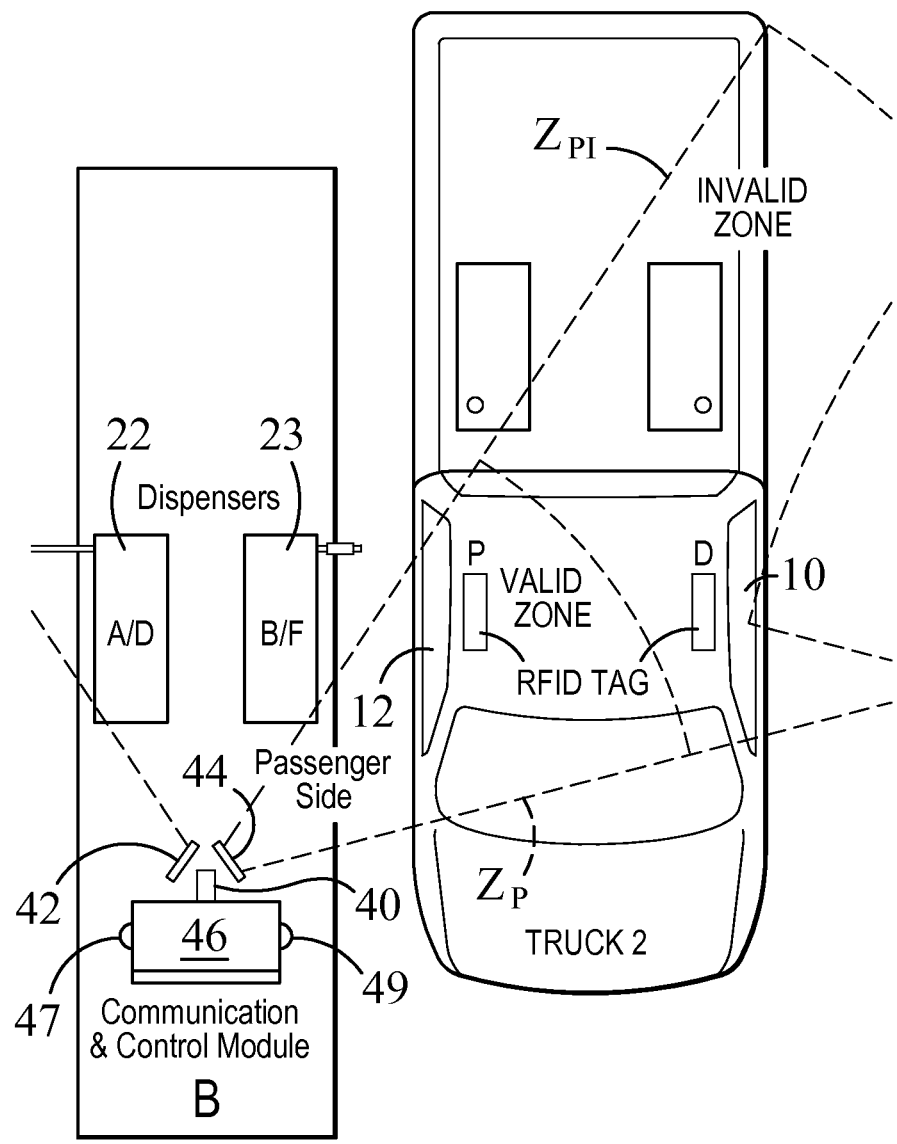
FIG. 3 is an enlarged second portion of the dispensing station and vehicles of FIG. 1.

Each antenna 42 and 44 has a detection sector generally designated by the broken lines. The first heavy broken line indicates the detection sector boundary for driver side antenna 42 which detects an RFID tag within the sector or effective or valid detection zone $Z_D$ for reading purposes, i.e., is within the effective power range. Likewise, the passenger side antenna 44 has a generally similar valid detection sector indicated by heavy broken lines and designated as zone $Z_P$ (FIG. 3). The extended or invalid RF ranges, which are below the power threshold for detection, reading and authorization, are designated as $Z_{DI}$ and $Z_{PI}$.

Figure 4:
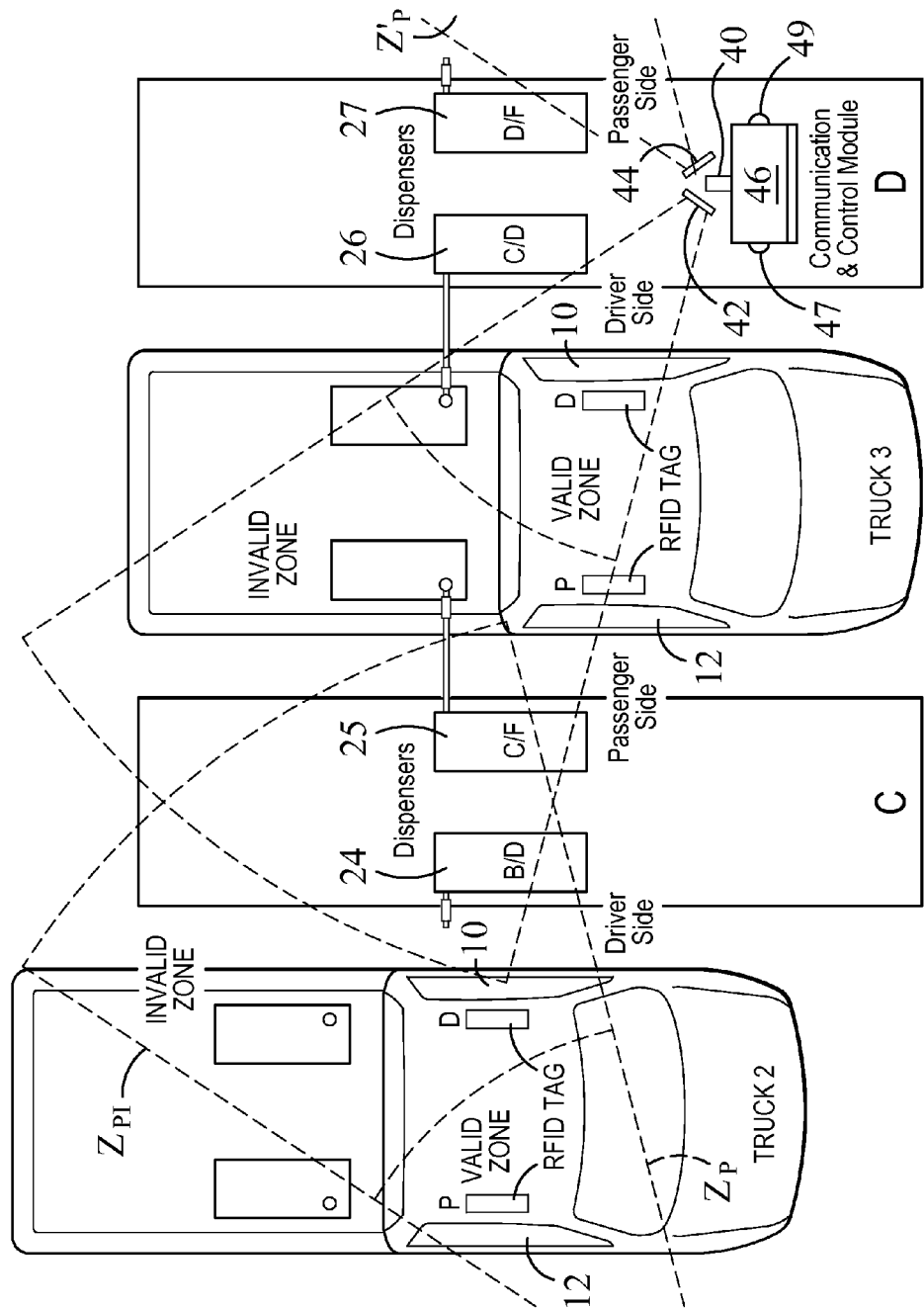
FIG. 4 is an enlarged third portion of the dispensing station and vehicles of FIG. 1.

With reference to FIG. 4, island D also mounts a pole 40 with a cabinet 46 having a control module 50. The cabinet 46 mounts a pair of status lights 47 and 49. The cabinet 46 is mounted to the pole below a pair of high-gain directional RF antennae 42 and 44 disposed at angles which intersect the typical driver side and passenger side of a vehicle properly positioned at the adjacent fuel lanes 3 and 4. The RF antennae define effective or valid driver and passenger zones $Z'_D$ and $Z'_P$, respectively, and extended or invalid driver and passenger zones $Z'_{DI}$ and $Z'_{PI}$, respectively. It will be appreciated that the extended detection zone $Z_{PI}$ for the B passenger side antenna, and the D driver side extended detection zone $Z_{DI}$ antenna intersect. However, the effective detection zones $Z_D$ and $Z_P$ for the respective antennas do not intersect.

With reference to FIG. 6, each communication and control module 50 has a power control 52 and dual channel RFID tag decoder 54 that continuously energizes and reads RFID tags that enter the scanned zone. The tag reader provides decoded data and signal strength for both the passenger side antenna 44 and the driver side antenna 42. The data and signal strength are continuously monitored as long as the RFID tags are within the effective valid read zone (e.g., $Z_D$, $Z_P$, $Z'_D$, $Z'_P$). Multiple tags can be read simultaneously. The data, signal strength and side identifier, which indicates whether the signal is read by the passenger or driver side antenna for each tag, is detected and sent to the communication and control module 50 for further processing.

With reference to FIGS. 2, 3 and 6, the communication and control module 50 receives signals from the RFID tag reader, stores and processes data from the tags that are of sufficient signal strength and are present for a minimum specified time. Status lights 47 and 49 are mounted exteriorly on the communication control cabinet adjacent each lane and are illuminated as an indicator that the vehicle tag is detected. When the valid conditions are met, the data is stored and forwarded to a host computer 60 for validation that fuel may be dispensed to the vehicle. Accordingly, a controller 56 will generate a signal to unlock the appropriate dispenser and measure the dispensed fuel. When the vehicle with the RFID tag exits the detector zone, a security control signal is transmitted to automatically lock via the fuel dispenser. The quantity of dispensed fuel is recorded in the controller.

It will be appreciated that the antennae 42 and 44 are oriented to align with the RFID tag on the vehicle upon proper positioning of the vehicle to receive fuel. In one preferred embodiment, the passenger tags 12 are mounted to the passenger side, the driver's tags 10 are mounted to the driver side and both are mounted typically above the door. When a vehicle with an RFID tag is parked next to a dispenser for more than five seconds, the status light 47 or 49 closest to the tag will illuminate. This will indicate that a valid tag is detected and the signal meets or exceeds the power threshold requirements.

The operation of the detection system can best be appreciated by reference to the trucks T1-T4 and their position within the various fuel lanes, 1-4 and the passing lane as indicated in FIG. 1. For example, when truck T1 with an RFID tag enters fuel lane 1 and stops at a typical fueling location, the status light 47 will slowly blink, indicating that the RF scanner is operational. After five seconds of validation detection, the status light blinks rapidly, indicating that the RFID tag 10 has been read, is on the correct side, and meets the signal strength requirements for the system. At that time, the vehicle data is read from the RFID tag 10, transmitted to the communication and control module 50 and is sent to the host computer 60 for authorization to proceed with the fueling process.

In the event that the vehicle is authorized, the status light 47 will change from a rapid blink to a steady, continuous illumination. If there is no authorization, the status light will turn off until the vehicle is removed. Approximately fifteen seconds after the vehicle is removed, the status light will again blink slowly.

In the event that a vehicle is authorized to receive dispensed fuel, the control module activates the fuel dispenser 21 or 22. The control module 50 preferably determines the amount of fuel dispensed via counting the pulses received from the dispenser.

The dispensing of fuel to the authorized vehicle may be terminated by one of three possible events:
1. Maximum authorized fuel amount for the vehicle is exceeded;
2. Pre-established time is exceeded after the fueling has stopped; and
3. Five second loss of detection of the authorized RFID tag.

When the vehicle exits the fueling area, a message is sent to the host computer with the vehicle ID, the amount of fuel dispensed, the elapsed time of the event and the departure of the vehicle from the fuel lane.

Figure 5:
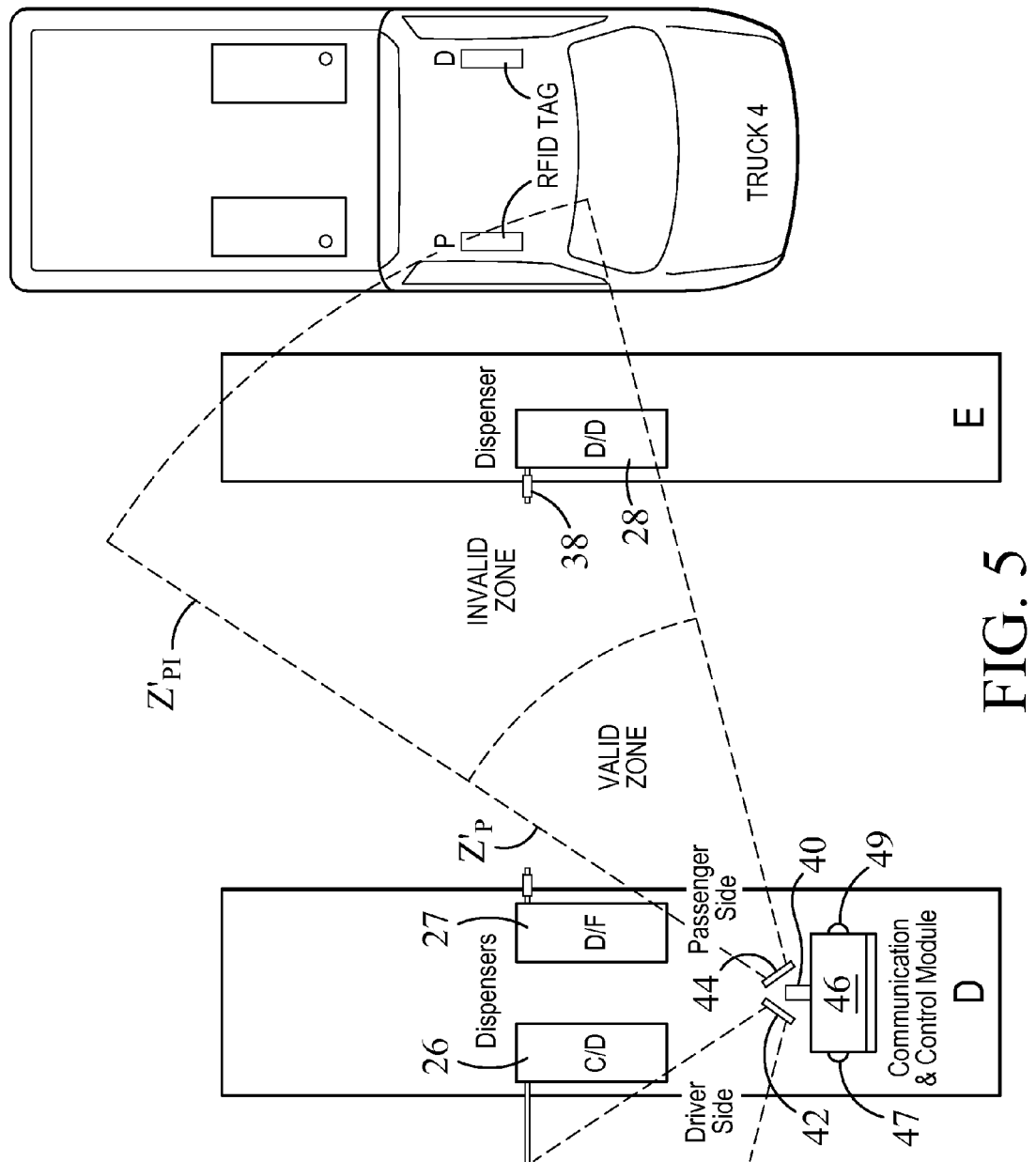
FIG. 5 is an enlarged fourth portion of the dispensing station and vehicles of FIG. 1.

In order to illustrate the operation of the vehicle detection system, reference is made to certain portions of FIG. 1 which have been designated as Portion I (FIG. 2), Portion II (FIG. 3) Portion III (FIG. 4) and Portion IV (FIG. 5), respectively.

With reference to Portion I (FIG. 2), it will be appreciated that the passenger side RFID tag can only be read by the passenger side antenna 42.

With respect to Portion II (FIG. 3), the driver side RFID tags 10 can only be read by the driver side antenna 44.

With respect to Portion III (FIG. 4), the signal strength of the RFID tags must exceed a threshold level. They can only be achieved by having a close proximity between the RFID tag and the reading antenna, which is typically 5 feet to 10 feet, as indicated by the zones. For example, a valid driver side RFID tag 10 in fuel lane 3 (zone $Z'_D$) is read by antenna 42 at island D. The invalid driver side RFID tag 10 in lane 2 is too distant from the fuel lane 3 antenna to have the required signal strength. Thus, the driver side RFID tag 10 in fuel lane 2 will be rejected.

With reference to Portion IV (FIG. 5), the RFID tag on a parked truck T4 in the passing lane will fail the signal test. The passing truck in any of the lanes will be disregarded since it will not meet the required stationary time of five seconds or greater in order to start the processing in the communication and control module 50.

While preferred embodiments of the foregoing detection system and fuel dispensing installation have been set forth for purposes of illustration, the foregoing description should not be deemed a limitation of the invention herein. Accordingly, various adaptations, alternatives and embodiments may occur to one skilled in the art without departing from the spirit and the scope of the present invention.

The invention claimed is:

1. A method for automatically validating authorization for fuel dispensing from a fuel dispenser of a vehicle having a driver side and a passenger side comprising:
    encoding a first RFID tag with data concerning the vehicle ID and a driver side indicator;
    encoding a second RFID tag with data concerning the vehicle ID and a passenger side indicator;
    mounting said first RFID tag to the driver side of the vehicle;
    mounting said second RFID tag to the passenger side of the vehicle;
    generating a first detection zone in a first lane from a location remote from said fuel dispenser;
    generating a second detection zone in a second lane from a location remote from said fuel dispenser;
    positioning said vehicle in a first or a second detection zone for a pre-established time interval;
    transmitting data from an RFID tag of said vehicle;
    processing data which meets a pre-established power strength threshold for said pre-established time interval to determine whether or not the vehicle is authorized.

2. The method of claim 1 further comprising generating a signal to allow fuel to be dispensed from a fuel dispenser.

3. The method of claim 2 further comprising generating a termination signal to terminate dispensing of fuel when a predetermined fuel quantity has been dispensed.

4. The method of claim 2 further comprising generating a control signal to secure the fuel dispenser when the vehicle leaves the detection zone.

5. The method of claim 1 further comprising automatically recording the amount of fuel dispensed.

6. The method of claim 1 further comprising generating a light indicative that the vehicle is within a detection zone.

7. The method of claim 1 further comprising generating a distinctive authorization light signal indicative that the vehicle is authorized.

8. The method of claim 1 wherein said data comprises vehicle fuel type, a customer code and a site code for the vehicle.

9. The method of claim 1 further comprising automatically terminating the dispensing of fuel to an authorized vehicle when one of each of the following is satisfied: the maximum authorized fuel amount for the vehicle is exceeded, and a pre-established time is exceeded after the fueling has stopped and a pre-established time for loss of detection of the authorized RFID tag.

10. A method for automatically validating authorization for receiving fuel at a multi-lane fuel dispensing installation for a vehicle having a driver side RFID tag and a passenger side RFID tag comprising:
    positioning the vehicle in a driver lane adjacent a fuel island having a fuel dispenser for a pre-established time interval;
    generating from a location remote from said fuel dispenser a valid detection zone which intersects only a driver side RFID tag or a passenger side RFID tag;
    transmitting data from a said RFID tag in said valid detection zone; and
    processing data which meets a pre-established power strength threshold for said pre-established time interval to determine whether or not the vehicle is authorized to receive fuel.

11. The method of claim 10 further comprising generating a signal to allow fuel to be dispensed from a fuel dispenser.

12. The method of claim 11 further comprising generating a signal to determine the amount of fuel dispensed and the identity of the vehicle.

13. The method of claim 10 further comprising generating a control signal to secure the fuel dispenser when the vehicle leaves the detection zone.

* * * * *